United States Patent
Lin et al.

(10) Patent No.: US 11,601,527 B2
(45) Date of Patent: Mar. 7, 2023

(54) METHOD AND DEVICE FOR TRANSMITTING IMAGE

(71) Applicant: GOERTEK TECHNOLOGY CO., LTD., Qingdao (CN)

(72) Inventors: Chingshun Lin, Qingdao (CN); Beichen Nong, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 46 days.

(21) Appl. No.: 16/757,318

(22) PCT Filed: Dec. 20, 2017

(86) PCT No.: PCT/CN2017/117552
§ 371 (c)(1),
(2) Date: Apr. 17, 2020

(87) PCT Pub. No.: WO2019/075901
PCT Pub. Date: Apr. 25, 2019

(65) Prior Publication Data
US 2020/0304605 A1    Sep. 24, 2020

(30) Foreign Application Priority Data
Oct. 19, 2017    (CN) .......................... 201710996585.0

(51) Int. Cl.
*H04L 69/04*    (2022.01)
*H04L 43/08*    (2022.01)
(Continued)

(52) U.S. Cl.
CPC .......... *H04L 69/04* (2013.01); *H04L 43/0835* (2013.01); *H04N 19/42* (2014.11); *H04L 1/18* (2013.01); *H04N 7/183* (2013.01)

(58) Field of Classification Search
None
See application file for complete search history.

(56) References Cited

U.S. PATENT DOCUMENTS

| 7,633,641 B2 | 12/2009 | Ishii |
| 2007/0153827 A1* | 7/2007 | Lee ..................... H04N 21/6377 375/E7.025 |

(Continued)

FOREIGN PATENT DOCUMENTS

| CN | 1466388 A | 1/2004 |
| CN | 1703069 A | 11/2005 |

(Continued)

OTHER PUBLICATIONS

CN Office Action in application No. 201710996585.0 dated Jul. 2, 2019.

(Continued)

*Primary Examiner* — Yemane Mesfin
*Assistant Examiner* — Jeff Banthrongsack
(74) *Attorney, Agent, or Firm* — Maschoff Brennan

(57) ABSTRACT

Provided are a method and device for transmitting an image. The method includes: adjusting an image compression ratio based on a current network transmission condition; performing compression processing on an image to be transmitted according to the adjusted image compression ratio to obtain a compressed image; and sending the compressed image to a viewing device side for the viewing device side to play the compressed image. The present disclosure ensures the fluency of image playback on the viewing device side, and improves the viewing experience of a user.

6 Claims, 4 Drawing Sheets

(51) Int. Cl.
      *H04N 7/18*       (2006.01)
      *H04N 19/42*      (2014.01)
      *H04L 43/0829*    (2022.01)
      *H04L 1/18*       (2023.01)

(56) References Cited

U.S. PATENT DOCUMENTS

2016/0117148 A1*   4/2016   Jeon .................... G06F 13/1673
                                                                                  710/53
2017/0076700 A1*   3/2017   Yoo .......................... G09G 5/39

FOREIGN PATENT DOCUMENTS

| CN | 101090497 A | 12/2007 |
| CN | 102984495 A | 3/2013 |
| CN | 103957389 A | 7/2014 |
| CN | 104394486 A | 3/2015 |
| CN | 106385374 A | 2/2017 |
| CN | 107046606 A | 8/2017 |
| CN | 107222665 A | 9/2017 |
| JP | 2010258850 A | 11/2010 |

OTHER PUBLICATIONS

CN Office Action in application No. 201710996585.0 dated Mar. 6, 2020.
CN Office Action in Application No. 201710996585.0 dated Sep. 2, 2020.

* cited by examiner

METHOD AND DEVICE FOR TRANSMITTING IMAGE

TECHNICAL FIELD

The present disclosure relates to the field of electronic technology, and in particular to a method and a device for transmitting image.

BACKGROUND

With the rapid development of drone technology, drone aerial photography technology has been widely used and popularized in industrial, agricultural, military and other fields.

At present, drone aerial photography technology is to install a gimbal or camera on the drone to capture images, and use a WIFI (Wireless Fidelity, wireless fidelity) network to send the captured images in real time to the video viewing device side for user viewing.

However, during the aerial photography of the drone, due to obstacles, weather, distance, signal interference and other factors, the transmission rate of the WIFI network may be reduced, which may cause a freeze when viewing images on the device, which affects the viewing experience of the user.

SUMMARY

In view of so, the present disclosure provides a method and a device for transmitting image to solve the technical problem of freeze of image playback.

In order to solve the above technical problem, the present disclosure provides a method for transmitting image, which may include:

adjusting an image compression ratio based on a current network transmission condition;

performing compression processing on an image to be transmitted according to the adjusted image compression ratio to obtain a compressed image; and sending the compressed image to a viewing device side for the viewing device side to play the compressed image.

Preferably, the adjusting an image compression ratio based on a current network transmission condition includes:

determining a total number of a sent packet and a total number of a lost packet within a preset time;

calculating a ratio of the total number of the sent packet and the total number of lost packet to obtain a packet loss ratio; and adjusting the image compression ratio based on the packet loss ratio.

Preferably, the determining the total number of the sent packet and the total number of the lost packet within the preset time includes:

determining the total number of the sent packet within the preset time;

determining a number of a received acknowledgment character (ACK) sent by the viewing device side; and determining the total number of the lost packet within the preset time based on the total number of the sent packet and the number of the received ACK within the preset time.

Preferably, the performing compression processing on an image to be transmitted according to the adjusted image compression ratio to obtain a compressed image includes:

determining whether the adjusted image compression ratio is greater than a preset image compression ratio;

if yes, performing compression processing on the image to be transmitted according to the preset image compression ratio to obtain a compressed image;

if not, performing compression processing on the image to be transmitted according to the adjusted image compression ratio to obtain a compressed image.

Preferably, the adjusting the image compression ratio based on the packet loss ratio includes:

adjusting the image compression ratio based on an image compression ratio adjustment formula;

where the image compression ratio adjustment formula is expressed as:

$$\text{New\_Comp}Q = (1 - (\text{Data\_D}/\text{Data\_T})) * \text{Old\_Comp}Q;$$

and where New_CompQ is the adjusted image compression ratio, Old_CompQ is the image compression ratio before adjusted, Data_D is the total number of the lost packet within the preset time, Data_T is the total number of the sent packet within the preset time, and Data_D/Data_T is the packet loss ratio.

The present disclosure provides a device for transmitting image, which may include a memory and a processing component, where the memory is for storing computer-readable program code, and the processing component is for executing the computer-readable program code to implement:

adjusting an image compression ratio based on a current network transmission condition; performing compression processing on an image to be transmitted according to the adjusted image compression ratio to obtain a compressed image; and sending the compressed image to a viewing device side for the viewing device side to play the compressed image.

Preferably, the adjusting an image compression ratio based on a current network transmission condition specifically is:

determining a total number of a sent packet and a total number of a lost packet within a preset time; calculating a ratio of the total number of the sent packet and the total number of lost packet to obtain a packet loss ratio; and adjusting the image compression ratio based on the packet loss ratio.

Preferably, the determining the total number of the sent packet and the total number of the lost packet within the preset time specifically is:

determining the total number of the sent packet within the preset time; determining a number of a received acknowledgment character (ACK) sent by the viewing device side; and determining the total number of the lost packet within the preset time based on the total number of the sent packet and the number of the received ACK within the preset time.

Preferably, the performing compression processing on an image to be transmitted according to the adjusted image compression ratio to obtain a compressed image specifically is:

determining whether the adjusted image compression ratio is greater than a preset image compression ratio; if yes, performing compression processing on the image to be transmitted according to the preset image compression ratio to obtain a compressed image; if not, performing compression processing on the image to be transmitted according to the adjusted image compression ratio to obtain a compressed image.

Preferably, the adjusting the image compression ratio based on the packet loss ratio specifically is:

adjusting the image compression ratio based on an image compression ratio adjustment formula;

where the image compression ratio adjustment formula is expressed as:

$$New\_CompQ = (1-(Data\_D/Data\_T))*Old\_CompQ;$$

and where New_CompQ is the adjusted image compression ratio, Old_CompQ is the image compression ratio before adjusted, Data_D is the total number of the lost packet within the preset time, Data_T is the total number of the sent packet within the preset time, and Data_D/Data_T is the packet loss ratio.

Compared with the prior art, the present disclosure may obtain the following technical effect:

The present disclosure provides a method and a device for transmitting image. When the network transmission rate is unstable, the image compression ratio is adjusted based on the network transmission state. The image to be transmitted is compressed according to the adjusted image compression ratio to obtain a compressed image. Therefore, when the network transmission rate is low, the data volume of the transmitted image data may be reduced while the frame number of the transmitted image frames maintains unchanged. The compressed image is sent to a viewing device side for the viewing device side to play the compressed image. Thereby the fluency of image playback on the viewing device side is ensured, and the viewing experience of a user is improved.

DETAILED DESCRIPTION OF EXAMPLE EMBODIMENTS

The embodiments of the present disclosure will be described in detail below with reference to the accompanying drawings and embodiments, so as to fully understand and implement the implementation process of how the present disclosure applies technical means to solve technical problems and achieve technical effects.

At present, drone aerial photography technology is widely used in various industries, providing great convenience for environmental detection, road condition monitoring, film and television production and other industries. Because the drone often works at long distances, in order to realize the real-time transmission of aerial images, a WIFI (Wireless Fidelity) apparatus is usually installed on the drone to realize the real-time transmission of captured images.

However, WIFI network signals are easily affected by distance and external factors, such as weather, obstacles, and interference from the same frequency signals, which reduces the transmission rate of the network. In the prior art, when the drone transmits an image, it compresses the image at a fixed compression ratio and sends it to a viewing device side after packetizing. When the network transmission rate reduces, the data volume of the image transmitted by the drone also greatly reduces, which causes a freeze phenomenon when the image is played on the viewing device side.

In order to solve the technical problem of image playback freeze, the inventor proposed a technical solution of the present disclosure through a series of studies. In the present disclosure, a method and a device for transmitting image are provided. When the network transmission rate is unstable, the image compression ratio is adjusted based on the network transmission state. The image to be transmitted is compressed according to the adjusted image compression ratio to obtain a compressed image. Therefore, when the network transmission rate is low, the data volume of the transmitted image data may be reduced while the frame number of the transmitted image frames maintains unchanged. The compressed image is sent to a viewing device side for the viewing device side to play the compressed image. Thereby the fluency of image playback on the viewing device side is ensured, and the viewing experience of a user is improved.

The technical solution of the present disclosure will be described in detail below with reference to the drawings.

Figure 1:
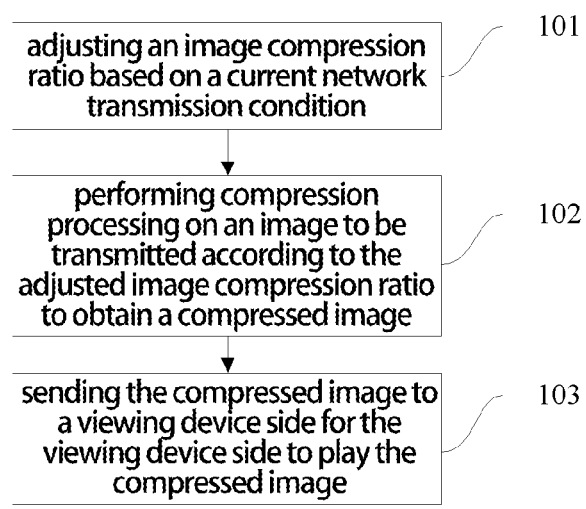
FIG. 1 is a flowchart of a method for transmitting image according to an embodiment of the present disclosure.

FIG. 1 is a flowchart of a method for transmitting image according to an embodiment of the present disclosure. The method may include:

101: adjusting an image compression ratio based on a current network transmission condition.

When the WIFI device installed on the drone encounters a wall, a large area of metal and load-bearing walls, wireless devices of the same frequency, strong signal interference, and weather factors will cause the network transmission to be unstable. Therefore, by judging the current network transmission state in real time and dynamically adjusting the image compression ratio of the drone, the amount of data sent by the drone can be increased.

102: performing compression processing on an image to be transmitted according to the adjusted image compression ratio to obtain a compressed image.

After the image to be transmitted is compressed according to the adjusted image compression ratio, a compressed image is obtained. The drone will encapsulate the compressed image and generate a data packet to send to the viewing device side.

103: sending the compressed image to a viewing device side for the viewing device side to play the compressed image.

The viewing device side may be any terminal device, such as a mobile phone, a computer, etc., which is equipped with a WIFI apparatus and is capable of receiving and playing the image. The user can view the images returned by the drone in real time through the APP (Application) installed on the mobile phone or computer.

Optionally, in some embodiments, the adjusting the image compression ratio based on the current network transmission condition may include:

determining a total number of a sent packet and a total number of a lost packet within a preset time;

calculating a ratio of the total number of the sent packet and the total number of lost packet to obtain a packet loss ratio; and adjusting the image compression ratio based on the packet loss ratio.

The network transmission state is mainly determined by the network transmission rate, and the factors that affect the network transmission rate are mainly bandwidth, delay, and packet loss. In the case of fixed bandwidth, the current network transmission state can be accurately judged through delay and packet loss. Therefore, by calculating the packet loss ratio within a certain period of time, the current network transmission state can be reflected. When the packet loss ratio in a preset time is higher, it indicates that the current network transmission condition is worse, and the lower packet loss ratio is that the current network transmission condition is better.

Optionally, in some embodiments, the determining the total number of the sent packet and the total number of the lost packet within the preset time includes:

determining the total number of the sent packet within the preset time;

determining a number of a received acknowledgment character (ACK) sent by the viewing device side; and determining the total number of the lost packet within the preset time based on the total number of the sent packet and the number of the received ACK within the preset time.

In the transmission protocol, when the drone sends a packet to the viewing device side, the viewing device side will reply with an ACK if it receives the packet, and it will not reply with an ACK if it does not receive the packet. Therefore, the total number of the lost packet within the preset time can be calculated by counting the total number of the sent packet and the number of ACKs received within the preset time.

The packet loss ratio within the preset time is calculated based on the total number of packets sent and the total number of packets lost.

In practical applications, the bit rate of the data sent by the drone can be calculated according to the following formula:

$$BR = W*H*Pixel\_Depth*FR*CompQ \quad (1)$$

Where, BR represents the number of the bit transmitted per second, W represents the image width, H represents the image height, Pixel_Depth represents the bit per pixel, FR represents the frame rate, and CompQ represents the image compression ratio.

It can be known from the formula (1) that the number of the bit per second transmitted by the drone is proportional to the image compression ratio. The larger the image compression ratio, the higher the amount of data transmitted.

The relationship between the bit rate and the network transmission condition is as follows (2):

$$New\_BR = (1-(Data\_D/Data\_T))*Old\_BR \quad (2)$$

Where, Old_BR indicates the bit rate before the network transmission state changes, New_BR indicates the bit rate after the network transmission state changes, and Data_D/Data_T indicates the packet loss ratio.

It can be known from the formula (2) that the relationship between the image compression ratio and the network transmission state can be obtained according to the change of the data volume transmitted with the network transmission state. Therefore, based on the above formulas (1) and (2), the following formula (3) can be calculated:

$$New\_CompQ = (1-(Data\_D/Data\_T))*Old\_CompQ \quad (3)$$

Optionally, in some embodiments, the adjusting the image compression ratio based on the packet loss ratio may include:

adjusting the image compression ratio based on an image compression ratio adjustment formula;

where the image compression ratio adjustment formula is expressed as:

$$New\_CompQ = (1-(Data\_D/Data\_T))*Old\_CompQ;$$

Where New_CompQ is the adjusted image compression ratio, Old_CompQ is the image compression ratio before adjusted, Data_D is the total number of the lost packet within the preset time, Data_T is the total number of the sent packet within the preset time, and Data_D/Data_T is the packet loss ratio.

Usually, an initial image compression ratio can be set in advance as Old_CompQ. When the network transmission state changes, the initial image compression ratio is adjusted based on the packet loss ratio within the current preset time to obtain the adjusted image compression ratio New_CompQ, and the image to be transmitted is compressed based on the adjusted image compression ratio to obtain the compressed image. In the next preset time, the adjusted image compression ratio New_CompQ=Old_CompQ obtained in the previous preset time is used for re-adjusting the image compression ratio based on the packet loss ratio in this preset time, to achieve the dynamic adjustment of the image compression ratio.

In this embodiment, the current network transmission state is confirmed by the packet loss ratio of the packet on the drone. When the network transmission rate is unstable, the image compression ratio is adjusted based on the network transmission state. The image to be transmitted is compressed according to the adjusted image compression ratio to obtain a compressed image. Therefore, when the network transmission rate is low, the data volume of the transmitted image data may be reduced while the frame number of the transmitted image frames maintains unchanged. The compressed image is sent to a viewing device side for the viewing device side to play the compressed image. Thereby the fluency of image playback on the viewing device side is ensured, and the viewing experience of a user is improved.

Figure 2:
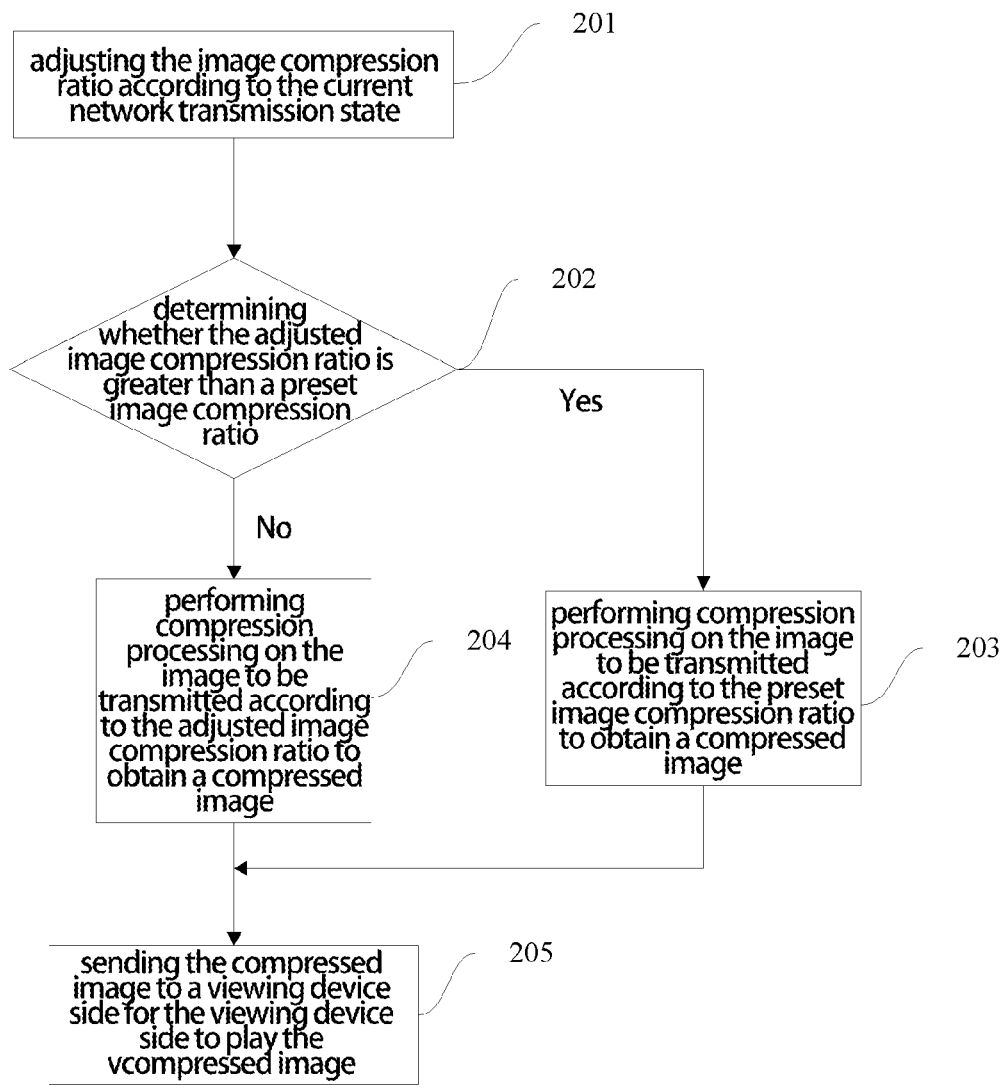
FIG. 2 is a flowchart of a method for transmitting image according to another embodiment of the present disclosure.

FIG. 2 is a flowchart of a method for transmitting image according to another embodiment of the present disclosure. The method may include:

201: adjusting the image compression ratio according to the current network transmission state;

202: determining whether the adjusted image compression ratio is greater than a preset image compression ratio; if yes, perform step 203; if no, perform step 204.

203: performing compression processing on the image to be transmitted according to the preset image compression ratio to obtain a compressed image.

204: performing compression processing on the image to be transmitted according to the adjusted image compression ratio to obtain a compressed image.

205: sending the compressed image to a viewing device side for the viewing device side to play the compressed image.

In order to ensure the sharpness of the image quality of the compressed image and avoid distortion of the compressed image, a preset image compression ratio needs to be set. If the adjusted image compression ratio is higher than the preset image compression ratio, the image compression processing is performed on the image to be transmitted according to the preset image compression ratio, which can ensure that the transmitted image is sufficiently clear when played on the viewing device side. If the adjusted image compression ratio is less than or equal to the preset image compression ratio, image compression processing is performed on the image to be transmitted according to the adjusted image compression ratio.

In this embodiment, by setting a preset image compression ratio, the poor quality of the compressed image is avoided caused by high image compression ratio when the image compression ratio is dynamically adjusted, and the clarity of the image played on the viewing device side is guaranteed and the user experience is improved.

Figure 3:
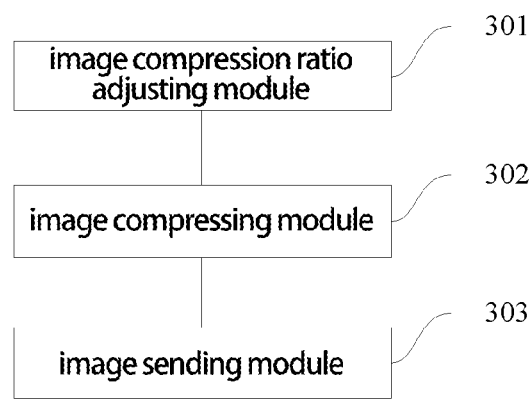
FIG. 3 is a schematic structural diagram of an apparatus for transmitting image according to an embodiment of the present disclosure.

FIG. 3 is a schematic structural diagram of an apparatus for transmitting image according to an embodiment of the present disclosure. The apparatus may include:

An image compression ratio adjusting module 301 is configured to adjust an image compression ratio based on a current network transmission condition.

When the WIFI device installed on the drone encounters a wall, a large area of metal and load-bearing walls, wireless devices of the same frequency, strong signal interference, and weather factors will cause the network transmission to be unstable. Therefore, by judging the current network transmission state in real time and dynamically adjusting the image compression ratio of the drone, the amount of data sent by the drone can be increased.

An image compressing module 302 is configured to perform compression processing on an image to be transmitted according to the adjusted image compression ratio to obtain a compressed image.

After the image to be transmitted is compressed according to the adjusted image compression ratio, a compressed image is obtained. The drone will encapsulate the compressed image and generate a data packet to send to the viewing device side.

An image sending module 303, configured to send the compressed image to a viewing device side for the viewing device side to play the compressed image.

The viewing device side may be any terminal device, such as a mobile phone, a computer, etc., which is equipped with a WIFI apparatus and is capable of receiving and playing the image. The user can view the images returned by the drone in real time through the APP (Application) installed on the mobile phone or computer.

Optionally, in some embodiments, the image compression ratio adjusting module 301 may include:

A determining unit, configured to determine a total number of a sent packet and a total number of a lost packet within a preset time;

A calculating unit, configured to calculate a ratio of the total number of the sent packet and the total number of lost packet to obtain a packet loss ratio; and An adjusting unit, configured to adjust the image compression ratio based on the packet loss ratio.

The network transmission state is mainly determined by the network transmission rate, and the factors that affect the network transmission rate are mainly bandwidth, delay, and packet loss. In the case of fixed bandwidth, the current network transmission state can be accurately judged through delay and packet loss. Therefore, by calculating the packet loss ratio within a certain period of time, the current network transmission state can be reflected. When the packet loss ratio in a preset time is higher, it indicates that the current network transmission condition is worse, and the lower packet loss ratio is that the current network transmission condition is better.

Optionally, in some embodiments, the determining unit may be specifically configured to:

determining the total number of the sent packet within the preset time;

determining a number of a received acknowledgment character (ACK) sent by the viewing device side; and determining the total number of the lost packet within the preset time based on the total number of the sent packet and the number of the received ACK within the preset time In the transmission protocol, when the drone sends a packet to the viewing device side, the viewing device side will reply with an ACK if it receives the packet, and it will not reply with an ACK if it does not receive the packet. Therefore, the total number of the lost packet within the preset time can be calculated by counting the total number of the sent packet and the number of ACKs received within the preset time.

The packet loss ratio within the preset time is calculated based on the total number of packets sent and the total number of packets lost.

In practical applications, the bit rate of the data sent by the drone can be calculated according to the following formula:

$$BR = W*H*\text{Pixel\_Depth}*FR*\text{CompQ} \quad (1)$$

Where, BR represents the number of bits transmitted per second, W represents the image width, H represents the image height, Pixel_Depth represents bits per pixel, FR represents the frame rate, and CompQ represents the image compression ratio.

It can be known from the formula (1) that the number of the bit per second transmitted by the drone is proportional to the image compression ratio. The larger the image compression ratio, the higher the amount of data transmitted.

The relationship between the bit rate and the network transmission condition is as follows (2):

$$\text{New\_}BR = (1-(\text{Data\_}D/\text{Data\_}T))*\text{Old\_}BR \quad (2)$$

Where Old_BR indicates the bit rate before the network transmission state changes, New_BR indicates the bit rate after the network transmission state changes, and Data_D/Data_T indicates the packet loss ratio.

It can be known from the formula (2) that the relationship between the image compression ratio and the network transmission state can be obtained according to the change of the data volume transmitted with the network transmission state. Therefore, based on the above formulas (1) and (2), the following formula (3) can be calculated:

$$\text{New\_CompQ} = (1-(\text{Data\_}D/\text{Data\_}T))*\text{Old\_CompQ} \quad (3)$$

Optionally, in some embodiments, the adjusting unit may be specifically configured to:

adjust the image compression ratio based on an image compression ratio adjustment formula;

where the image compression ratio adjustment formula is expressed as:

$$\text{New\_CompQ} = (1-\text{Data\_}D/\text{Data\_}T)*\text{Old\_CompQ};$$

Where New_CompQ is the adjusted image compression ratio, Old_CompQ is the image compression ratio before adjusted, Data_D is the total number of the lost packet within the preset time, Data_T is the total number of the sent packet within the preset time, and Data_D/Data_T is the packet loss ratio.

Usually, an initial image compression ratio can be set in advance as Old_CompQ. When the network transmission state changes, the initial image compression ratio is adjusted based on the packet loss ratio within the current preset time to obtain the adjusted image compression ratio New_CompQ, and the image to be transmitted is compressed based on the adjusted image compression ratio to obtain the compressed image. In the next preset time, the adjusted image compression ratio New_CompQ=Old_CompQ obtained in the previous preset time is used for re-adjusting the image compression ratio based on the packet loss ratio in this preset time, to achieve the dynamic adjustment of the image compression ratio.

In this embodiment, the current network transmission state is confirmed by the packet loss ratio of the packet on the drone. When the network transmission rate is unstable, the image compression ratio is adjusted based on the network transmission state. The image to be transmitted is compressed according to the adjusted image compression ratio to obtain a compressed image. Therefore, when the network transmission rate is low, the data volume of the transmitted image data may be reduced while the frame number of the transmitted image frames maintains unchanged. The compressed image is sent to a viewing device side for the viewing device side to play the compressed image. Thereby the fluency of image playback on the viewing device side is ensured, and the viewing experience of a user is improved.

Figure 4:
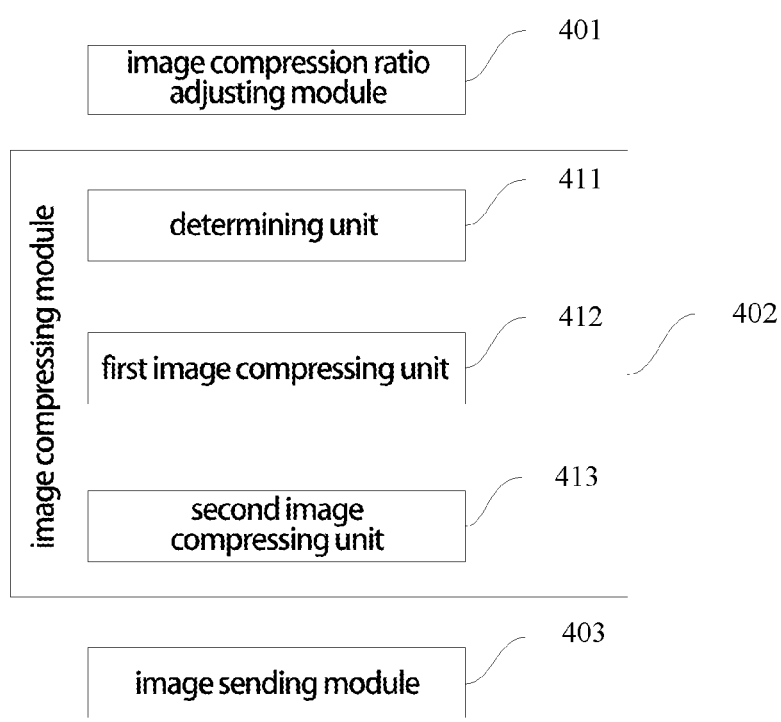
FIG. 4 is a schematic structural diagram of an apparatus for transmitting image according to another embodiment of the present disclosure.

FIG. 4 is a schematic structural diagram of an apparatus for transmitting image according to another embodiment of the present disclosure. The apparatus may include:

an image compression ratio adjusting module 401, configured to adjust the image compression ratio according to the current network transmission state;

an image compressing module 402, configured to perform compression processing on the image to be transmitted according to the adjusted image compression ratio to obtain a compressed image.

The image compressing module 402 may include:

a determining unit 411, configured to determine whether the adjusted image compression ratio is greater than a preset image compression ratio; if yes, a first image compressing unit 412 is triggered; if not, a second image compressing unit 413 is triggered.

The first image compressing unit 412 is configured to perform compression processing on the image to be transmitted according to the preset image compression ratio to obtain a compressed image.

The second image compressing unit 413 is configured to perform c compression processing on the image to be transmitted according to the adjusted image compression ratio to obtain a compressed image.

An image sending module 403 is configured to send the compressed image to a viewing device side for the viewing device side to play the compressed image.

In order to ensure the sharpness of the image quality of the compressed image and avoid distortion of the compressed image, a preset image compression ratio needs to be set. If the adjusted image compression ratio is higher than the preset image compression ratio, the image compression processing is performed on the image to be transmitted according to the preset image compression ratio, which can ensure that the transmitted image is sufficiently clear when played on the viewing device side. If the adjusted image compression ratio is less than or equal to the preset image compression ratio, image compression processing is performed on the image to be transmitted according to the adjusted image compression ratio.

In this embodiment, by setting a preset image compression ratio, the poor quality of the compressed image is avoided caused by high image compression ratio when the image compression ratio is dynamically adjusted, and the clarity of the image played on the viewing device side is guaranteed and the user experience is improved.

Figure 5:
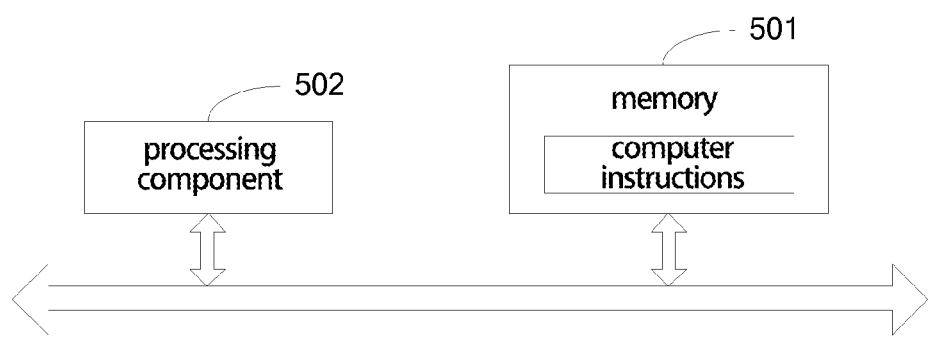
FIG. 5 is a schematic structural diagram of a device for transmitting image according to an embodiment of the present disclosure.

FIG. 5 is a schematic structural diagram of a device for transmitting image according to an embodiment of the present disclosure. The device may include: a memory 501 and a processing component 502.

The memory 501 stores one or more computer program instructions.

The processing component 502 calls and executes the one or more computer program instructions to achieve the following operations:

adjusting an image compression ratio based on a current network transmission condition; performing compression processing on an image to be transmitted according to the adjusted image compression ratio to obtain a compressed image; and sending the compressed image to a viewing device side for the viewing device side to play the compressed image.

Optionally, the processing component 502 is further configured to execute all or part of the foregoing method steps.

The processing component 502 may include one or more processors to execute computer instructions. Of course, the second processing component may also be implemented by one or more application-specific integrated circuit (ASIC), digital signal processor (DSP), digital signal processing device (DSPD), programmable logic device (PLD), field programmable gate array (FPGA), controller, microcontroller, microprocessor, or other electronic components to perform the method described above.

The memory 501 can be implemented by any type of volatile or non-volatile storage devices or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

Of course, the electronic device may further include other components, such as an input/output interface, a communication component, and the like. The input/output interface provides an interface between the processing component and a peripheral interface module. The peripheral interface module may be an output device, an input device, and the like. The communication component is configured to facilitate wired or wireless communication between the mobile device and other devices, such as communication with a control device, and so on.

An embodiment of the present disclosure provides a computer program product including a computer-readable storage medium for storing computer instructions used by the key detection device according to the embodiment of the present disclosure, which includes procedures involved by a method for performing the key detection method in any one of the foregoing embodiments.

In a typical configuration, a computing device includes one or more processors (CPUs), an input/output interface, a network interface, and a memory.

The memory may include a non-permanent memory, a random access memory (RAM), and/or a non-volatile memory in a computer-readable medium, such as a read-only memory (ROM) or a flash RAM. The memory is an example of a computer-readable medium.

The computer-readable medium includes permanent and non-permanent, mobile and non-mobile media, which may implement information storage by any method or technology. The information may be a computer-readable instruction, a data structure, a program module, or other data. Examples of computer storage media include, but are not limited to, a phase change RAM (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disk (DVD) or other optical memories, a magnetic tape cartridge, a magnetic tape storage device or other magnetic storage devices or any other non-transmission media, which may be used to store information accessible by a computing device. As defined herein, the computer-readable medium does not include non-transitory computer-readable media such as modulated data signals and carrier waves.

Certain words are used in the description and claims to refer to specific components. Those skilled in the art will understand that hardware manufacturers may use different terms to refer to the same component. This specification and claims do not use the differences in names as a way to distinguish components, but the differences in functions of components as a criterion for distinguishing between components. As used throughout the specification and claims, "comprising" is an open-ended term and should be interpreted as "including but not limited to". "Approximately" means that within the acceptable error range, those skilled in the art can solve the technical problem within a certain error range, and basically achieve the technical effect. In addition, the term "coupling" includes any direct and indirect electrical coupling means. Therefore, if a first apparatus is described as being coupled to a second apparatus, it means that the first apparatus can be directly electrically coupled to the second apparatus, or indirectly electrically coupled to the second device through other apparatuses or coupling means. The subsequent description of the specification is a preferred embodiment for implementing the present disclosure, but the description is for the purpose of illustrating the general principles of the present disclosure and is not intended to limit the scope of the present disclosure. The scope of protection of the present disclosure shall be determined by the scope defined by the appended claims.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

The above description shows and describes several preferred embodiments of the present disclosure, but as mentioned before, it should be understood that the present disclosure is not limited to the form disclosed herein, and should not be regarded as an exclusion of other embodiments, but can be used for each other combinations, modifications, and environments, and can be altered within the scope of the application concept described herein, through the teachings above or related technology or knowledge in the relevant field. Modifications and changes made by those skilled in the art without departing from the spirit and scope of the present disclosure should all fall within the protection scope of the appended claims of the present disclosure.

What is claimed is:

1. A method for transmitting image, comprising:
adjusting an image compression ratio based on a current network transmission condition;
performing compression processing on an image to be transmitted according to the adjusted image compression ratio to obtain a compressed image; and
sending the compressed image to a viewing device side for the viewing device side to play the compressed image,
wherein the adjusting an image compression ratio based on a current network transmission condition comprises:
determining a total number of a sent packet and a total number of a lost packet within a preset time;
calculating a ratio of the total number of the sent packet and the total number of lost packet to obtain a packet loss ratio; and
adjusting the image compression ratio based on the packet loss ratio;
wherein the performing compression processing on an image to be transmitted according to the adjusted image compression ratio to obtain a compressed image comprises:
determining whether the adjusted image compression ratio is greater than a preset image compression ratio;
if yes, performing compression processing on the image to be transmitted according to the preset image compression ratio to obtain a compressed image;
if not, performing compression processing on the image to be transmitted according to the adjusted image compression ratio to obtain a compressed image.

2. The method according to claim 1, wherein the determining the total number of the sent packet and the total number of the lost packet within the preset time comprises:
determining the total number of the sent packet within the preset time;
determining a number of a received acknowledgment character (ACK) sent by the viewing device side; and
determining the total number of the lost packet within the preset time based on the total number of the sent packet and the number of the received ACK within the preset time.

3. The method according to claim 1, wherein the adjusting the image compression ratio based on the packet loss ratio comprises:
adjusting the image compression ratio based on an image compression ratio adjustment formula;
wherein the image compression ratio adjustment formula is expressed as:

$$\mathrm{New\_Comp}Q = (1-(\mathrm{Data\_}D/\mathrm{Data\_}T))*\mathrm{Old\_Comp}Q;$$

and wherein NewCompQ is the adjusted image compression ratio, Old_CompQ is the image compression ratio before adjusted, Data_D is the total number of the lost packet within the preset time, Data_T is the total number of the sent packet within the preset time, and Data_/Data_T is the packet loss ratio.

4. A device for transmitting image, comprising a memory and a processing component, wherein the memory is for storing computer-readable program code, and the processing component is for executing the computer-readable program code to implement:
adjusting an image compression ratio based on a current network transmission condition; performing compression processing on an image to be transmitted according to the adjusted image compression ratio to obtain a compressed image; and sending the compressed image to a viewing device side for the viewing device side to play the compressed image,
wherein the adjusting an image compression ratio based on a current network transmission condition specifically is:
determining a total number of a sent packet and a total number of a lost packet within a preset time; calculating a ratio of the total number of the sent packet and the total number of lost packet to obtain a packet loss ratio; and adjusting the image compression ratio based on the packet loss ratio;

wherein the performing compression processing on an image to be transmitted according to the adjusted image compression ratio to obtain a compressed image specifically is:

determining whether the adjusted image compression ratio is greater than a preset image compression ratio; if yes, performing compression processing on the image to be transmitted according to the preset image compression ratio to obtain a compressed image; if not, performing compression processing on the image to be transmitted according to the adjusted image compression ratio to obtain a compressed image.

5. The device according to claim 4, wherein the determining the total number of the sent packet and the total number of the lost packet within the preset time specifically is:

determining the total number of the sent packet within the preset time; determining a number of a received acknowledgment character (ACK) sent by the viewing device side; and determining the total number of the lost packet within the preset time based on the total number of the sent packet and the number of the received ACK within the preset time.

6. The device according to claim 4, wherein the adjusting the image compression ratio based on the packet loss ratio specifically is:

adjusting the image compression ratio based on an image compression ratio adjustment formula;

wherein the image compression ratio adjustment formula is expressed as:

$$\text{New\_CompQ} = (1 - (\text{Data\_D}/\text{Data\_T})) * \text{Old\_CompQ};$$

and wherein New_CompQ is the adjusted image compression ratio, Old_CompQ is the image compression ratio before adjusted, Data_D is the total number of the lost packet within the preset time, Data_T is the total number of the sent packet within the preset time, and Data_D/Data_T is the packet loss ratio.

* * * * *